US00RE49236E

(19) United States
(12) Reissued Patent
Yokoyama et al.

(10) Patent Number: US RE49,236 E
(45) Date of Reissued Patent: Oct. 4, 2022

(54) CONTACT DEVICE AND ELECTROMAGNETIC RELAY

(71) Applicant: PANASONIC INTELLECTUAL PROPERTY MANAGEMENT CO., LTD., Osaka (JP)

(72) Inventors: Koji Yokoyama, Osaka (JP); Satoshi Sakai, Osaka (JP)

(73) Assignee: PANASONIC INTELLECTUAL PROPERTY MANAGEMENT CO., LTD., Osaka (JP)

(21) Appl. No.: 16/437,568

(22) Filed: Jun. 11, 2019

Related U.S. Patent Documents

Reissue of:
(64) Patent No.: 9,679,707
Issued: Jun. 13, 2017
Appl. No.: 15/088,294
Filed: Apr. 1, 2016

(30) Foreign Application Priority Data

Apr. 13, 2015 (JP) ..... 2015-081415

(51) Int. Cl.
*H01H 1/22* (2006.01)
*H01H 1/20* (2006.01)

(52) U.S. Cl.
CPC ..... *H01H 1/22* (2013.01); *H01H 1/2075* (2013.01)

(58) Field of Classification Search
CPC ..... H01H 1/22; H01H 1/2075; H01H 50/546; H01H 50/02; H01H 1/34; H01H 2050/025; H01H 51/065
(Continued)

(56) References Cited

U.S. PATENT DOCUMENTS 5,892,194 A * 4/1999 Uotome ..... H01H 51/065 218/68
7,157,996 B2 * 1/2007 Enomoto ..... H01H 50/02 335/126
(Continued)

FOREIGN PATENT DOCUMENTS

CN 103311000 A 9/2013
EP 2325860 * 11/2010
(Continued)

OTHER PUBLICATIONS

English Translation of Chinese Search Report dated Dec. 6, 2019 for the related Chinese Patent Application No. 201610220651.0.
(Continued)

*Primary Examiner* — Kenneth Whittington
(74) *Attorney, Agent, or Firm* — Greenblum & Bernstein, P.L.C.

(57) ABSTRACT

A contact device includes a pair of fixed contacts, a movable contactor, a contactor holder, a movable shaft, and a base. The pair of fixed contacts are aligned in a first direction. The movable contactor comes into or out of contact with the pair of fixed contacts in a second direction orthogonal to the first direction. The contactor holder holds the movable contactor. The movable shaft moves the contactor holder in the second direction so that the movable contactor comes into or out of contact with the fixed contacts. The base accommodates the fixed contacts, the movable contactor, and the contactor holder. The base has a projection projecting from a position opposing the contactor holder in a third direction orthogonal to both the first and second directions.

16 Claims, 8 Drawing Sheets

(58) Field of Classification Search
USPC ..... 335/126, 131
See application file for complete search history.

(56) References Cited

U.S. PATENT DOCUMENTS

| | | | | |
|---|---|---|---|---|
| 7,868,720 | B2 * | 1/2011 | Bush | H01H 50/023 200/16 A |
| 7,876,183 | B2 * | 1/2011 | Uruma | H01H 50/04 335/126 |
| 8,138,863 | B2 * | 3/2012 | Tanaka | H01H 1/54 335/126 |
| 8,179,217 | B2 * | 5/2012 | Kawaguchi | H01F 7/1615 335/124 |
| 8,188,818 | B2 * | 5/2012 | Cho | H01H 50/023 335/126 |
| 8,222,980 | B2 * | 7/2012 | Yamagata | H01H 50/023 335/126 |
| 8,274,345 | B2 * | 9/2012 | Sugisawa | H01H 50/54 335/126 |
| 8,941,453 | B2 * | 1/2015 | Yano | H01H 1/66 335/131 |
| 9,082,576 | B2 * | 7/2015 | Nishimura | H01H 50/643 |
| 9,431,200 | B2 * | 8/2016 | Choi | H01H 51/065 |
| 2006/0050466 | A1 * | 3/2006 | Enomoto | H01H 50/02 361/160 |
| 2009/0066450 | A1 * | 3/2009 | Yano | H01H 49/00 335/203 |
| 2009/0096559 | A1 * | 4/2009 | Yano | H01H 9/443 335/187 |
| 2010/0060392 | A1 * | 3/2010 | Cho | H01H 51/065 335/124 |
| 2010/0134224 | A1 * | 6/2010 | Choi | H01H 50/045 335/132 |
| 2011/0120844 | A1 * | 5/2011 | Hoffmann | H01H 50/02 200/275 |
| 2013/0106543 | A1 | 5/2013 | Isozaki et al. | |
| 2013/0234811 | A1 | 9/2013 | Nishimura | |
| 2013/0257567 | A1 | 10/2013 | Takaya et al. | |
| 2013/0285774 | A1 * | 10/2013 | Hasegawa | H01H 3/28 335/189 |
| 2013/0293324 | A1 * | 11/2013 | Fujimoto | H01H 50/026 335/156 |
| 2015/0022291 | A1 * | 1/2015 | Kashimura | H01H 9/443 335/131 |
| 2015/0077202 | A1 * | 3/2015 | Enomoto | H01H 1/50 335/171 |
| 2015/0194284 | A1 | 7/2015 | Uruma et al. | |
| 2015/0206685 | A1 * | 7/2015 | Naka | H01H 50/02 335/187 |
| 2015/0255235 | A1 | 9/2015 | Nishimura et al. | |
| 2016/0233039 | A1 * | 8/2016 | Kanematsu | H01H 50/00 |

FOREIGN PATENT DOCUMENTS

| | | | |
|---|---|---|---|
| JP | 2005-038706 | | 2/2005 |
| JP | 2005-071915 | A | 3/2005 |
| JP | 2006-019148 | A | 1/2006 |
| JP | 2012-022982 | | 2/2012 |
| JP | 2012-243589 | A | 12/2012 |
| JP | 2013-098051 | A | 5/2013 |
| JP | 2014-017086 | | 1/2014 |
| JP | 2014-041777 | A | 3/2014 |

OTHER PUBLICATIONS

English Translation of Chinese Search Report dated Apr. 21, 2020 for Chinese Patent Application No. 201910547726.X.

* cited by examiner

CONTACT DEVICE AND ELECTROMAGNETIC RELAY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

1. Technical Field

The present disclosure relates to a contact device and an electromagnetic relay including it.

2. Background Art

Well-known conventional contact devices include fixed contacts and a movable contactor, which comes into or out of contact with the fixed contacts. A contact device disclosed in Japanese Unexamined Patent Application Publication No. 2012-22982 includes a holder holding a movable contactor, and a movable shaft connected to the holder.

SUMMARY

The present disclosure provides a contact device having a simple structure and a sufficient arc space to prevent an arc-over, and also an electromagnetic relay including such a contact device.

The contact device of present disclosure includes a pair of fixed contacts, a movable contactor, a contactor holder, a movable shaft, and a base. The pair of fixed contacts are aligned in a first direction. The movable contactor comes into or out of contact with the pair of fixed contacts in a second direction orthogonal to the first direction. The contactor holder holds the movable contactor. The movable shaft moves the contactor holder in the second direction so that the movable contactor comes into or out of contact with the fixed contacts. The base accommodates the fixed contacts, the movable contactor, and the contactor holder. The base has a projection projecting from a position opposing the contactor holder in a third direction orthogonal to both the first and second directions.

The electromagnetic relay of the present disclosure includes the above-mentioned contact device, and a driving device which drives the movable shaft so that the movable contactor comes into or out of contact with the fixed contacts. The contact device and the electromagnetic relay of the present disclosure have a sufficient arc space to prevent an arc-over.

DETAILED DESCRIPTION OF PREFERRED EMBODIMENTS

Problems associated with the conventional contact device will now be described briefly prior to describing exemplary embodiments of the present disclosure.

In the above-mentioned conventional contact device disclosed in Japanese Unexamined Patent Application Publication No. 2012-22982, the contactor holder (holder) comes into contact with the inner surface of the base to regulate the rotation (twist) of the contactor holder and the movable contactor.

In this contact device, however, while the contactor holder and the movable contactor twists, the movable contactor and the inner surface of the base come too close to each other to have a sufficient arc space required for current interruption.

The contact device and the electromagnetic relay including it according to the exemplary embodiments of the present disclosure will now be described with reference to drawings.

First Exemplary Embodiment

Figure 1:
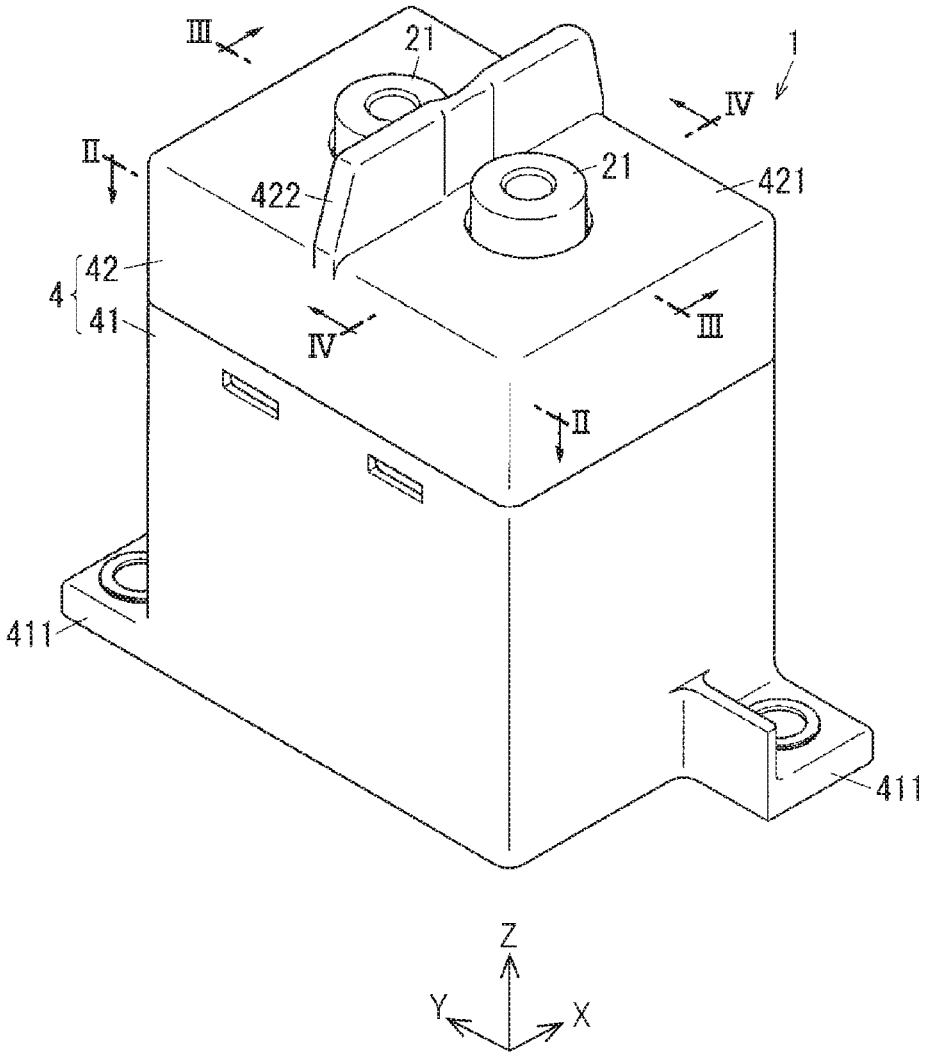
FIG. 1 is an external perspective view of an electromagnetic relay according to a first exemplary embodiment of the present disclosure.
Figure 2:
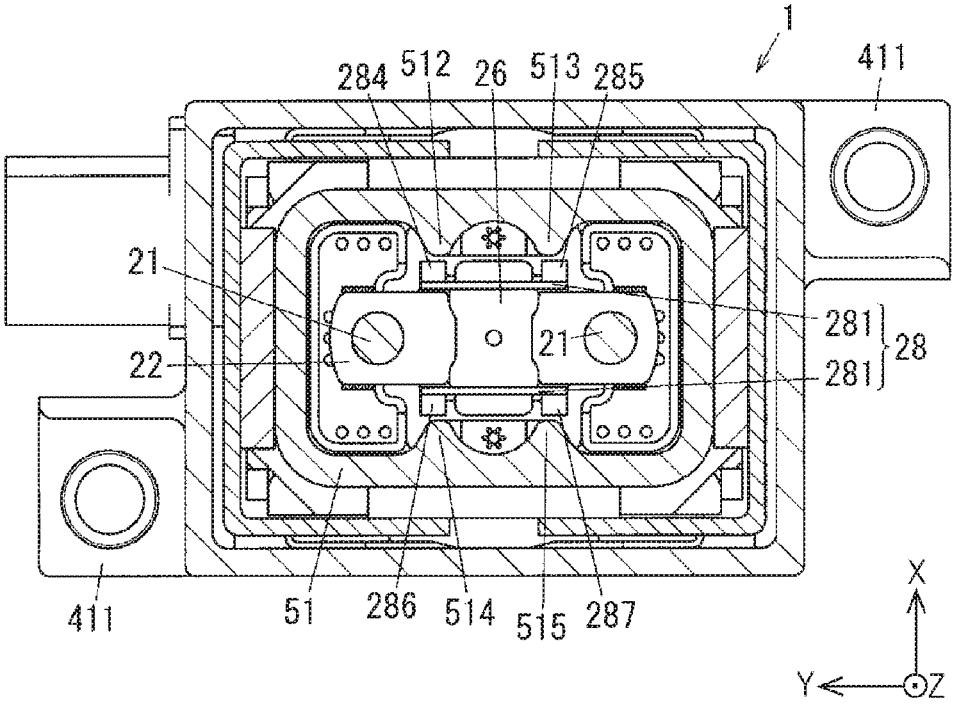
FIG. 2 is a sectional view of the electromagnetic relay taken along line II-II of FIG. 1.
Figure 3:
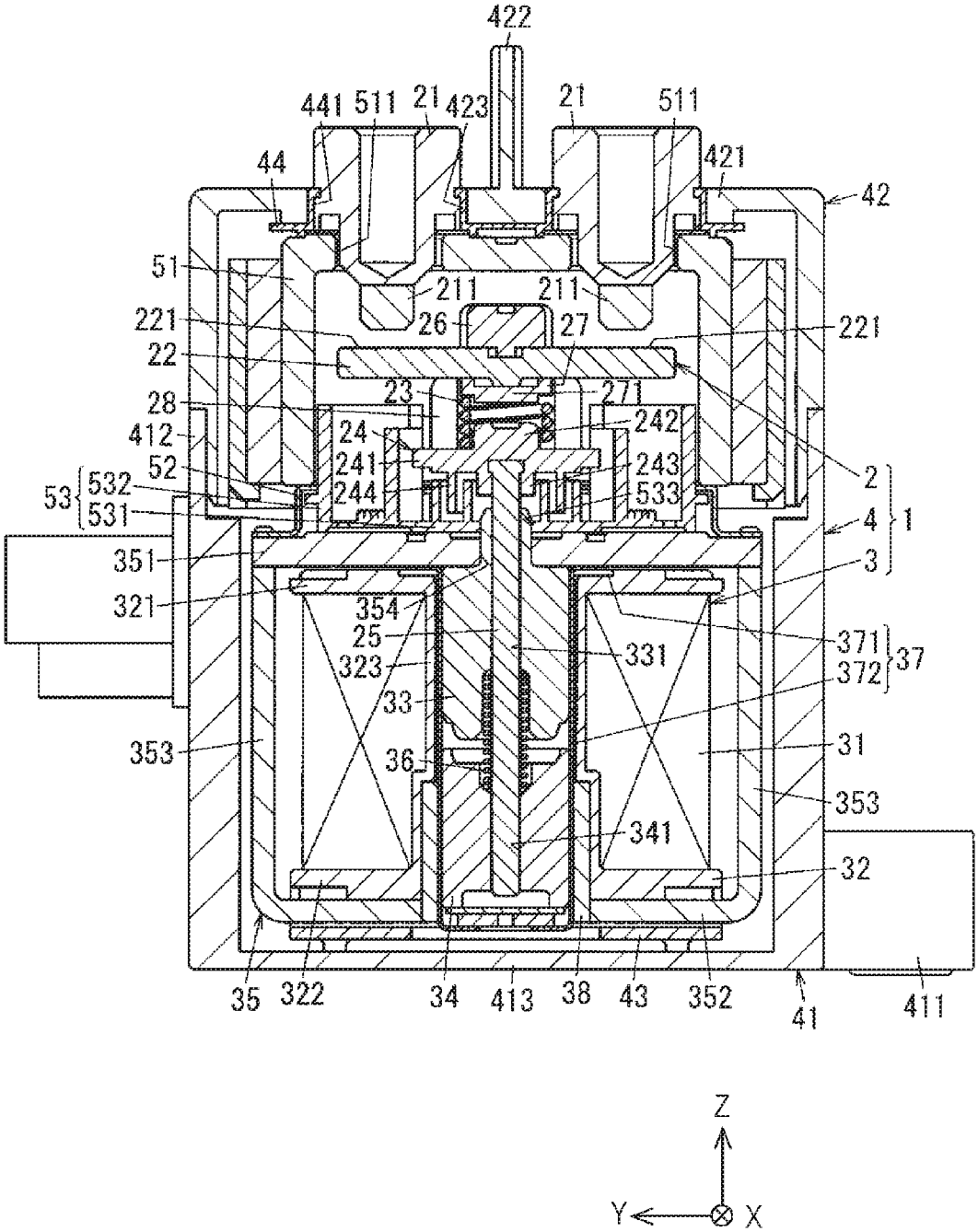
FIG. 3 is a sectional view of the electromagnetic relay taken along line of FIG. 1.
Figure 4:
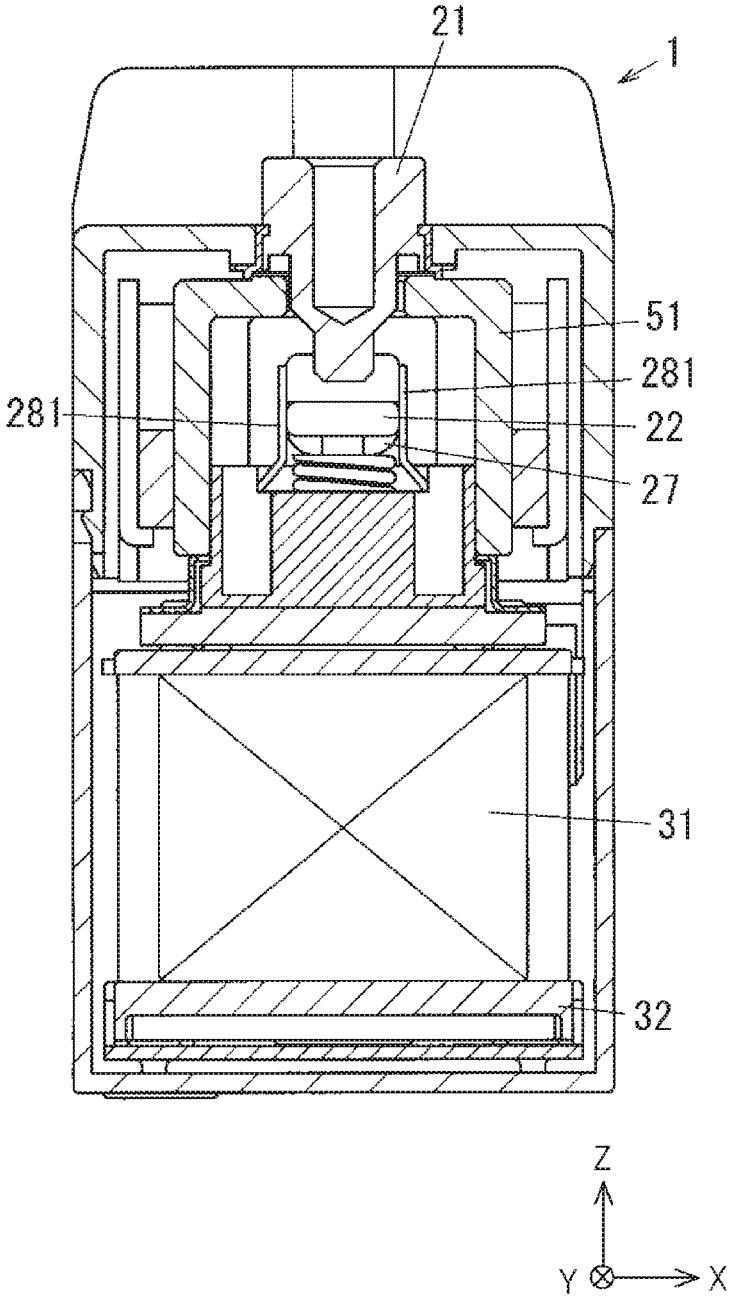
FIG. 4 is a sectional view of the electromagnetic relay taken along line IV-IV of FIG. 1.
Figure 5:
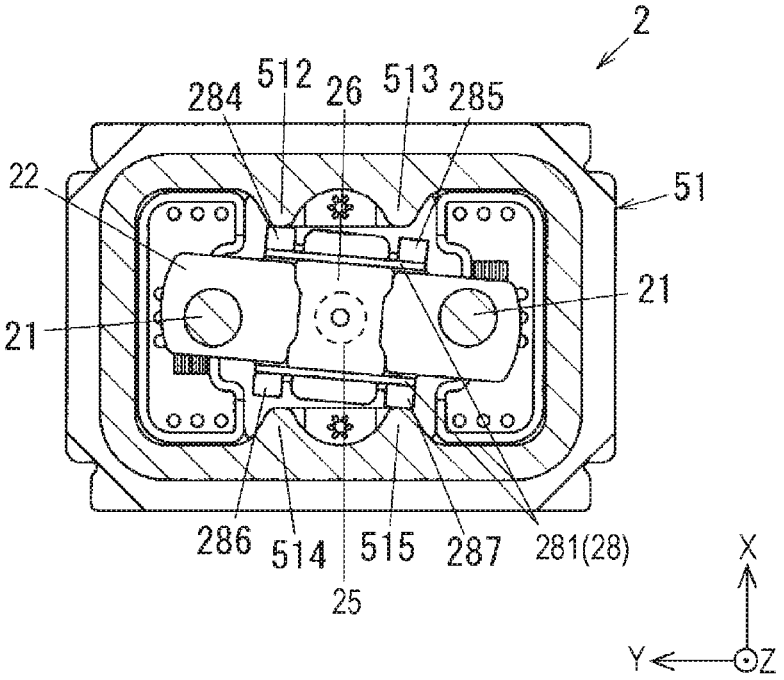
FIG. 5 is a sectional view showing a state where a movable contactor shown in FIG. 2 twists.
Figure 6:
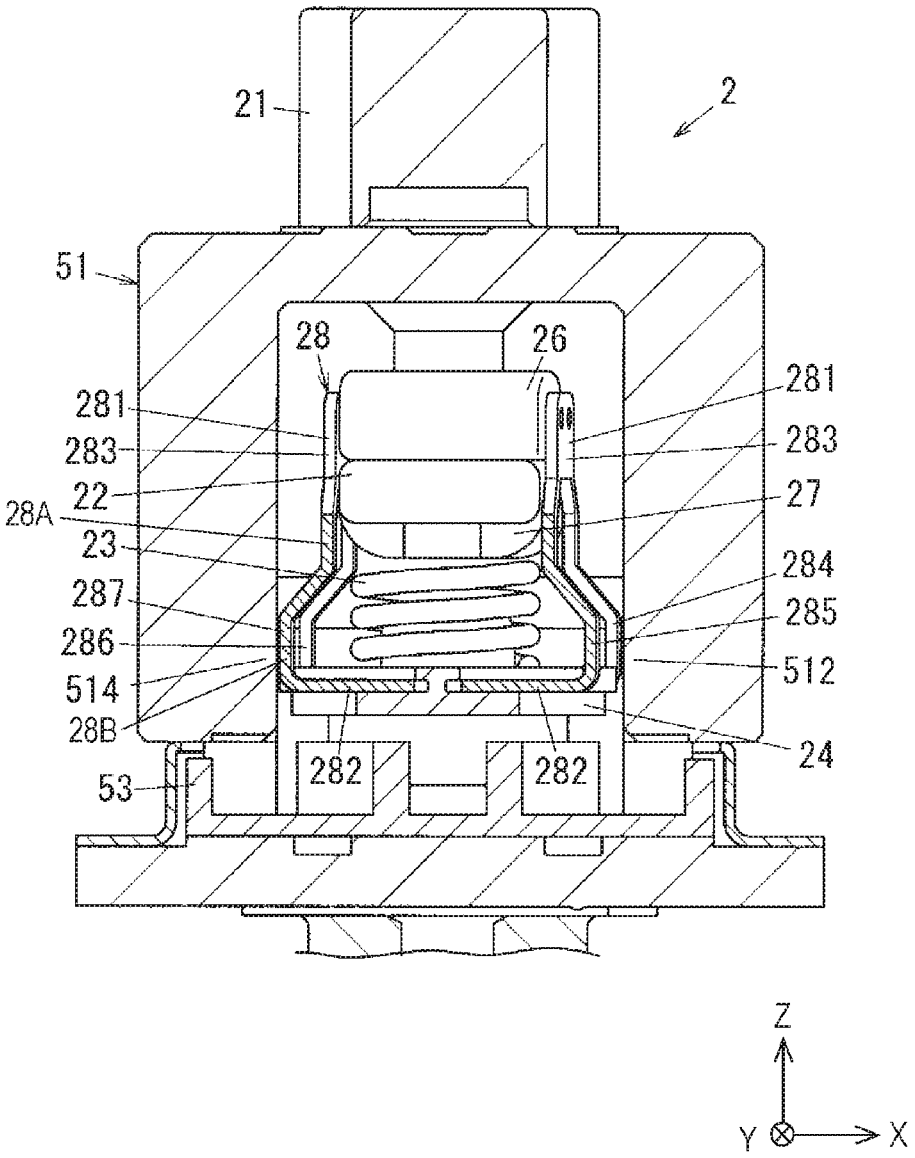
FIG. 6 is an enlarged sectional view showing a state where the movable contactor shown in FIG. 4 twists.
Figure 7:
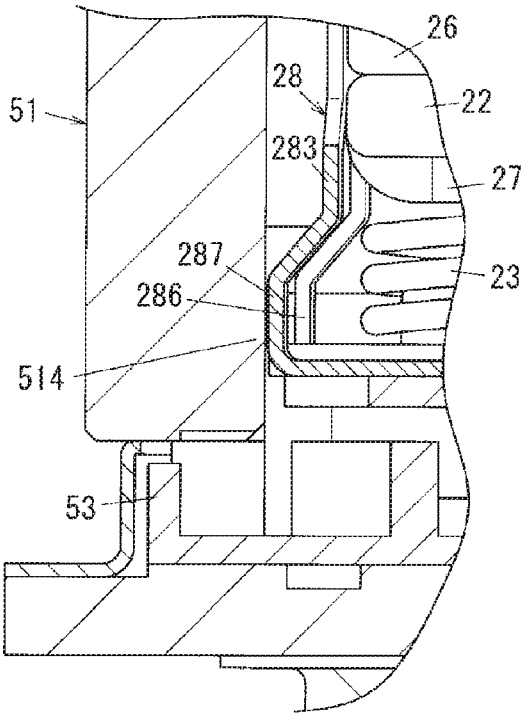
FIG. 7 is a partially enlarged view of FIG. 6.

FIG. 1 is an external perspective view of electromagnetic relay 1 according to a first exemplary embodiment of the present disclosure. FIGS. 2 to 4 are sectional views of electromagnetic relay 1. FIG. 2 is taken along line II-II, FIG. 3 is taken along line and FIG. 4 is taken along line IV-IV. FIG. 5 shows a state where movable contactor 22 included in FIG. 2 twists, and FIG. 6 shows, in an enlarged scale, a state where movable contactor 22 included in FIG. 4 twists. FIG. 7 shows a part of FIG. 6 in a further enlarged scale.

Electromagnetic relay 1 includes contact device 2, driving device 3, and box-shaped housing 4. Housing 4 accommodates contact device 2 and driving device 3.

Contact device 2 includes a pair of fixed terminals 21, movable contactor 22, pressure-contact spring 23, spring receiver 24, movable shaft 25, adjusting portion 26, yoke 27, contactor holder 28, base (case) 51, connection body 52, and insulating member 53.

Each of fixed terminals 21 is made of a conductive material such as copper and is formed into an approximate circular column. Each of fixed terminals 21 has fixed contact 211 at its bottom. Fixed terminals 21 are inserted into through-holes 511 of base 51, respectively, and are brazed to base 51 with their top end projecting from the upper surface of base 51.

Fixed contacts 211 are fixed to the bottoms (lower ends) of fixed terminals 21, respectively. The fixed contacts 211 are aligned in a first direction (Y direction) as shown in FIG. 3. These contacts 211 can be formed integrally with fixed terminals 21, respectively.

Movable contactor 22 comes into or out of contact with the pair of fixed contacts 211, and more specifically, in a second direction (Z direction) orthogonal to the first direction (Y direction). Movable contactor 22 is a flat plate extending in the first direction (Y direction), and includes movable contacts 221 at the right and left ends of its upper surface. In short, movable contacts 221 are formed at both ends in the longitudinal direction of movable contactor 22. Each of movable contacts 221 is located to oppose respective one of fixed contacts 211 with a predetermined spacing therebetween. Movable contactor 22 further includes yoke 27, which is fitted into the approximate center of movable contactor 22 in the first direction (Y direction).

Pressure-contact spring 23, which is a coil spring, is disposed between spring bearing 24 and yoke 27 so as to expand and contract in the second direction (Z direction). Yoke 27 has positioning projection 271, which will be described later. Positioning projection 271 is fitted into the top end of pressure-contact spring 23 so that spring 23 can be positioned with respect to yoke 27 and movable contactor 22.

Spring receiver 24 is made of, for example, an electrically insulating material such as resin and formed into an approximate rectangular plate. Spring receiver 24 has base part 241 whose upper surface has, at its approximate center, an approximately disk-shaped positioning projection 242. Positioning projection 242 is fitted into the bottom end of pressure-contact spring 23 so that spring receiver 24 is positioned with respect to spring 23.

Movable shaft 25 moves contactor holder 28 in the second direction (Z direction) so that movable contactor 22 comes into or out of contact with the pair of fixed contacts 211. In other words, movable shaft 25 moves along its axis so that movable contactor 22 comes into or out of contact with fixed contacts 211. More specifically, movable shaft 25 is coupled to contactor holder 28 and moves in the second direction (Z direction) so that movable contactor 22 comes into or out of contact with fixed contacts 211. Movable shaft 25 has an approximately round bar shape extending in the second direction. Movable shaft 25 is coupled to moving core 34 of driving device 3 at a bottom end thereof, and to spring receiver 24 at a top end thereof. Shaft 25 is fixed to moving core 34 while being inserted into through-hole 331 of fixed core 33, return spring 36, and through-hole 341 of moving core 34.

Adjusting portion 26 is made of a magnetic material and formed into, for example, an approximate rectangular plate. Adjusting portion 26 is mounted at the approximate center of the upper surface of movable contactor 22 in the first direction (Y direction) and is fixed to contactor holder 28. Adjusting portion 26 may alternatively have a shape other than a plate.

Yoke 27, which is made of a magnetic material, has an open top and an approximately U-shaped cross section when seen from the first direction (Y direction). Yoke 27 is disposed under the approximate center of movable contactor 22 in such a manner as to sandwich this approximate center in the front-to-back direction (X direction). Yoke 27 has positioning projection 271 formed into an approximate disk at the approximate center of the bottom surface thereof.

Contactor holder 28 holds movable contactor 22 as shown in FIG. 6. Holder 28 has a pair of holding parts 281 each having bottom part 282 and side part 283. Bottom part 282 and side part 283 are formed by bending a non-magnetic material. The pair of holding parts 281, which are far apart from each other in the front-to-back direction, are formed integrally with spring receiver 24. Spring receiver 24 is located between bottom parts 282 and pressure-contact spring 23. Thus, spring receiver 24 electrically isolates bottom parts 282 and pressure-contact spring 23.

The pair of bottom parts 282 and adjusting portion 26 sandwich movable contactor 22, yoke 27, and pressure-contact spring 23 in the vertical direction (Z direction). Consequently, pressure-contact spring 23 pushes movable contactor 22 upward to bring its upper surface into contact with adjusting portion 26, thereby regulating the travel of movable contactor 22 toward fixed contacts 211. Side part 283 extends upward from the edge of bottom part 282. Side parts 283 oppose each other in the X direction. Side parts 283 are in sliding contact with movable contactor 22 and yoke 27. Side parts 283 come into contact with adjusting portion 26 so as to sandwich adjusting portion 26 in the front-to-back direction. Bottom part 282 has, for example, a plate shape, but may alternatively have other shapes. Side part 283 has, for example, a plate shape, but may alternatively have other shapes.

As described above, adjusting portion 26 and yoke 27 are made of a magnetic material, while contactor holder 28 is made of a non-magnetic material. Consequently, when movable contacts 221 come into contact with fixed contacts 211, respectively, to supply a current to movable contactor 22, a magnetic flux is generated around movable contactor 22 and passes through adjusting portion 26 and yoke 27. As a result, a magnetic suction force acts between adjusting portion 26 and yoke 27. This force reduces the electromagnetic repulsive force generated between fixed contacts 211 and movable contacts 221, thereby reducing a decrease in the contact pressure between fixed contacts 211 and movable contacts 221.

As shown in FIG. 3, base 51 is formed into a box with an open bottom and made of a heat-resistant material such as ceramic. Base 51 accommodates fixed contacts 211, movable contactor 22, and contactor holder 28. Base 51 is provided with two through-holes 511 aligned in the right and left direction on an upper surface thereof.

Connection body 52 is brazed to the periphery of the opening of base 51 at a first end thereof and to first yoke board 351 of yoke 35 in driving device 3 at a second end thereof.

Insulating member 53 includes bottom part 531 and projection 532. Bottom part 531 is provided, at its approximate center, with insertion hole 533 into which movable shaft 25 is inserted. Insulating member 53 is made of an insulating material such as ceramic and synthetic resin and formed into an approximate rectangular parallelepiped with an open top. The top end of the peripheral wall of insulating member 53 is in contact with the inner surface of the peripheral wall of base 51. Consequently, at the opening of base 51, insulating member 53 isolates the arc generated between fixed contacts 211 and movable contacts 221 from the joint between base 51 and connection body 52.

In contact device 2, spring receiver 24 is disposed on the side of movable contactor 22 opposite to the side having the pair of fixed contacts 211. Spring receiver 24 has base part 241, positioning projection 242, projection 243, and partition wall 244. Partition wall 244 is formed around movable shaft 25. More specifically, partition wall 244 is, for example, cylindrical and extends from base part 241 toward insulating member 53 along the axis of movable shaft 25.

Providing the above-described partition wall 244 suppresses foreign matter generated while movable contactor 22 comes into or out of contact with fixed contacts 211 from entering insertion hole 533.

As shown in FIG. 2, contact device 2 has a plurality of projections (four projections 512-515 in FIG. 2). Each of projections 512-515 projects from base 51 at a respective position that opposes contactor holder 28 in a third direction (X direction) orthogonal to both the first direction (Y direction) and the second direction (Z direction).

As shown in FIG. 6, contactor holder 28 has upper area 28A and lower area 28B. Lower area 28B is more distant from movable contactor 22 than upper area 28A in the second direction (Z direction). In contactor holder 28, lower area 28B is longer than upper area 28A in the third direction (X direction). More specifically, in contactor holder 28, the pair of holding parts 281 have a plurality of projected areas (four projected areas 284-287 in FIG. 6) in positions facing projections 512-515, respectively.

Each of projections 512-515 has a curved end surface. On the other hand, contactor holder 28 has a flat surface facing projections 512-515. The curved surfaces and the flat surface come into stable contact with each other.

The operation of contact device 2 will now be described with reference to FIG. 3. First, when driving device 3 displaces (moves) movable shaft 25 upward, spring receiver 24 and contactor holder 28 which are connected to movable shaft 25 are also displaced upward. Together with the displacement of spring receiver 24 and contactor holder 28, movable contactor 22 moves upward. As a result, movable contactor 22 comes into contact with the pair of fixed contacts 211 and provides electrical continuity between fixed contacts 211.

Driving device 3 will now be described in detail with reference to FIG. 3. Driving device 3 is an electromagnet block and drives movable shaft 25 so that movable contactor 22 comes into or out of contact with the pair of fixed contacts 211.

Driving device 3 includes excitation winding 31, coil bobbin 32, fixed core 33, moving core 34, yoke 35, return spring 36, cylindrical member 37, and bush 38. Driving device 3 further includes a pair of coil terminals (not shown) connected to both ends of excitation winding 31.

Coil bobbin 32 is made of a resin material and formed into an approximate cylinder. Bobbin 32 includes flanges 321 and 322 at its top and bottom ends, respectively. Between flanges 321 and 322, there is cylindrical part 323 around which excitation winding 31 is wound. The inner diameter of cylindrical part 323 is larger in the lower part than in the upper part.

Both ends of excitation winding 31 are connected to a pair of terminal areas (not shown) formed on flange 321 of coil bobbin 32 and are also connected to a pair of coil terminals via lead wires (not shown) connected to the terminal areas. The coil terminals are made of a conductive material such as copper and are connected to the lead wires by soldering.

Fixed core 33 is made of a magnetic material and formed into an approximate circular column and is fixed inside coil bobbin 32. More specifically, fixed core 33 is formed in cylindrical member 37 accommodated in cylindrical part 323 of coil bobbin 32.

Moving core 34 is made of a magnetic material and formed into an approximate cylinder. Moving core 34 is disposed in coil bobbin 32 so as to face fixed core 33 in the axial direction. More specifically, moving core 34 is formed in cylindrical member 37, is fixed to movable shaft 25, and moves in the vertical direction (Z direction) depending on whether excitation winding 31 is energized or not. More specifically, moving core 34 moves upward when excitation winding 31 is energized, and moves downward when the current to excitation winding 31 is interrupted.

Yoke 35 includes first yoke board 351, second yoke board 352, and a pair of third yoke boards 353. First yoke board 351 is disposed above coil bobbin 32, and second yoke board 352 is disposed below coil bobbin 32. Third yoke boards 353 extend from the right and left ends of second yoke board 352 to first yoke board 351. First yoke board 351 is an approximate rectangular plate and is provided with insertion hole 354 at the approximate center of its upper surface. The top end of fixed core 33 is inserted into insertion hole 354.

Return spring 36 is inserted both into the lower part of through-hole 331 of fixed core 33 and the upper part of through-hole 341 of moving core 34. Return spring 36 is disposed in a compressed state between fixed core 33 and moving core 34 so as to push moving core 34 downward.

Cylindrical member 37 has a bottomed cylindrical shape and accommodated in cylindrical part 323 of coil bobbin 32. Cylindrical member 37 has flange 371 at its top end. Flange 371 is located between flange 321 of coil bobbin 32 and first yoke board 351. Cylindrical member 37 has cylindrical part 372, which accommodates moving core 34 in a lower part thereof. Cylindrical part 372 further accommodates fixed core 33.

Bush 38 is made of a magnetic material and formed into a cylinder. Bush 38 is fitted into a gap between the inner circumferential surface of the lower part of coil bobbin 32 and the outer circumferential surface of cylindrical member 37. Bush 38 forms a magnetic circuit together with first yoke board 351, second yoke board 352, third yoke boards 353, fixed core 33, and moving core 34.

Housing 4 will now be described in detail with reference to FIGS. 1 and 3.

Housing 4 is made of a resin material and formed into an approximate rectangular box. Housing 4 is composed of box-shaped housing body 41 with an open top and box-shaped cover 42 covering the open top of housing body 41.

As shown in FIG. 1, housing body 41 has protrusions 411 on both lateral walls Each of protrusions 411 is provided with an insertion hole used for screwing electromagnetic relay 1 to a mounting surface. As shown in FIG. 3, housing body 41 has step 412 along the periphery of the top opening Therefore, the inner dimensions of housing body 41 are larger in the upper end than in the lower end.

Cover 42 has a box shape with an open bottom. Top surface 421 of cover 42 is provided with partition board 422 which approximately divides top surface 421 into right and left halves. Top surface 421 half-divided by partition board 422 has a pair of insertion holes 423 into which fixed terminals 21 are inserted.

When contact device 2 and driving device 3 are accommodated in housing 4, bottom cushion rubber 43 is inserted between second yoke board 352 of yoke 35 and bottom part 413 of housing body 41. Between base 51 and cover 42, top cushion rubber 44 is inserted. Top cushion rubber 44 is provided with insertion holes 441 into which fixed terminals 21 are inserted, respectively.

In electromagnetic relay 1 having the above-described structure, return spring 36 slides moving core 34 downward, which in turn moves movable shaft 25 downward. Accordingly, movable contactor 22 is pushed down by adjusting portion 26, and moves downward together with adjusting portion 26. Therefore, in the initial state, movable contacts 221 are away from fixed contacts 211.

When excitation winding 31 is energized, and moving core 34 is slid upward by the suction of fixed core 33, movable shaft 25 connected to moving core 34 also moves upward. As a result, spring receiver 24 (contactor holder 28) connected to movable shaft 25 moves toward fixed contacts 211, and in turn, movable contactor 22 also moves upward. This makes movable contacts 221 come into contact with fixed contacts 211, thereby providing electrical continuity between contacts 221 and 211.

When the current to excitation winding 31 is interrupted, return spring 36 slides moving core 34 downward, and in turn, movable shaft 25 moves downward. As a result, spring receiver 24 (contactor holder 28) moves downward, and in turn, movable contactor 22 moves downward. This makes movable contacts 221 apart from fixed contacts 211.

In contact device 2, the pair of movable contacts 221 are part of movable contactor 22 and formed integrally with movable contactor 22. However, as a modified example of the present exemplary embodiment, a pair of movable contacts may be formed as a separate component from movable contactor 22. Also in such a contact device, along with the movement of movable shaft 25, the movable contacts as a separate component from movable contactor 22 move together with movable contactor 22 and come into or out of contact with fixed contacts 211.

The twist of movable contactor 22 and contactor holder 28 around movable shaft 25 in contact device 2 will now be described with reference to FIGS. 5 to 7. The clockwise twist of movable contactor 22 and contactor holder 28 around movable shaft 25 results as follows. In this case, movable contactor 22 and contactor holder 28 do not come into contact with the inner surface of base 51. Instead, projected area 284 comes into contact with projection 512, and projected area 287 comes into contact with projection 515. On the other hand, the counterclockwise twist of movable contactor 22 and contactor holder 28 around movable shaft 25 results as follows. Movable contactor 22 and contactor holder 28 do not come into contact with the inner surface of base 51. Instead, projected area 285 comes into contact with projection 513, and projected area 286 comes into contact with projection 514. Thus, when movable contactor 22 and contactor holder 28 twist around movable shaft 25, contactor holder 28 comes into contact with projections 512-515.

As described above, even when the rotation (twist) of movable contactor 22 is regulated, movable contactor 22 and base 51 have a sufficient space therebetween in base 51, particularly in the upper area of base 51. This provides an arc space for extending an arc generated between the pair of fixed contacts 211 and movable contactor 22, thereby reducing arc-over. In particular, when base 51 has an open bottom, the rotation of movable contactor 22 can be regulated at the base opening (bottom) formed with high accuracy, thereby having high accuracy of the regulation of the rotation.

As described earlier, it is preferable that at least the end surface of each of projections 512-515 is curved, and that contactor holder 28 has a flat surface opposing projections 512-515. This configuration provides a stable contact between the curved and flat surfaces. As a result, movable contactor 22 can be prevented from being unreturnable to the state before twist because of locking of a corner of movable contactor 22 with respect to the inner wall of base 51 when the rotation of movable contactor 22 is regulated. In particular, base 51 made of ceramic is prevented from being chipped.

In contact device 2, contactor holder 28 is made in point contact with projections 512-515 so that the rotation of holder 28 can be regulated with high accuracy.

Figure 8:
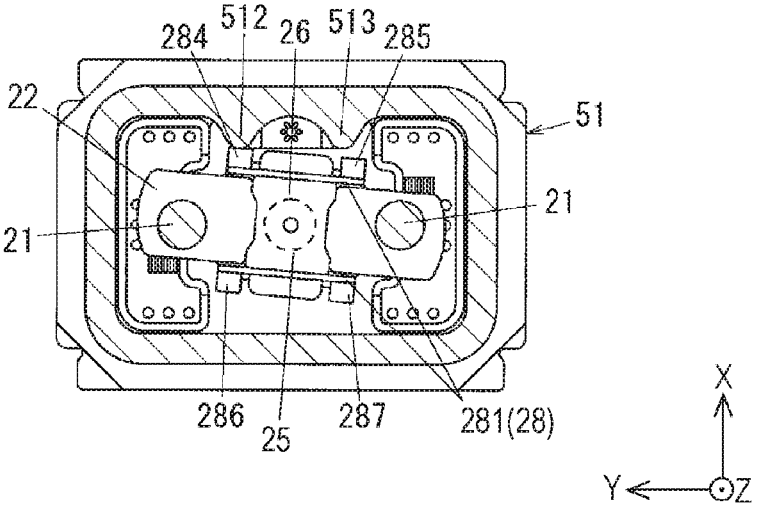
FIG. 8 is a sectional view of a modified example of the electromagnetic relay according to the first exemplary embodiment of the present disclosure.

In contact device 2, base 51 has projections 512 and 513 on a first inner surface and projections 514 and 515 on a second. The first and second inner surfaces oppose each other in the third direction (X direction). Projections 512 and 513 are aligned in the first direction as well as projections 514 and 515 are. Alternatively, as shown in a modified example of the present exemplary embodiment of FIG. 8, base 51 may have projections 512 and 513 on only one of the first and second inner surfaces. In short, in the configuration of FIG. 8, base 51 has projections 512 and 513 aligned in the first direction (Y direction). Also in this configuration, movable contactor 22 and base 51 have a sufficient space therebetween in base 51 regardless of whether movable contactor 22 and contactor holder 28 twist either clockwise or counterclockwise around movable shaft 25. This provides a sufficient arc space and prevents arc-over regardless of the direction of twist of movable contactor 22.

Figure 9:
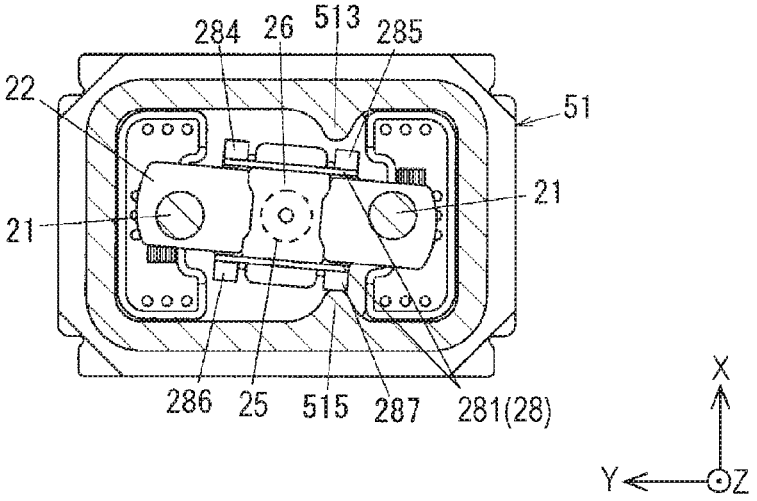
FIG. 9 is a sectional view of another modified example of the electromagnetic relay according to the first exemplary embodiment of the present disclosure.

Further alternatively, as shown in another modified example of the present exemplary embodiment of FIG. 9, base 51 may have a pair of projections 513 and 515 on it's the first and second inner surfaces, respectively. In short, base 51 may have each of projections 513 and 515 on respective one of these opposite inner surfaces in a manner that projections 513 and 515 oppose each other in the third direction (X direction). Also in this configuration, movable contactor 22 and base 51 have a sufficient space therebetween in base 51 regardless of whether movable contactor 22 and contactor holder 28 twist either clockwise or counterclockwise around movable shaft 25. This provides a sufficient arc space and prevents arc-over regardless of the direction of twist of movable contactor 22.

When, for example, the twist of movable shaft 25 is previously restricted to one direction, base 51 may have only one of projections 512-515.

Second Exemplary Embodiment

Figure 10:
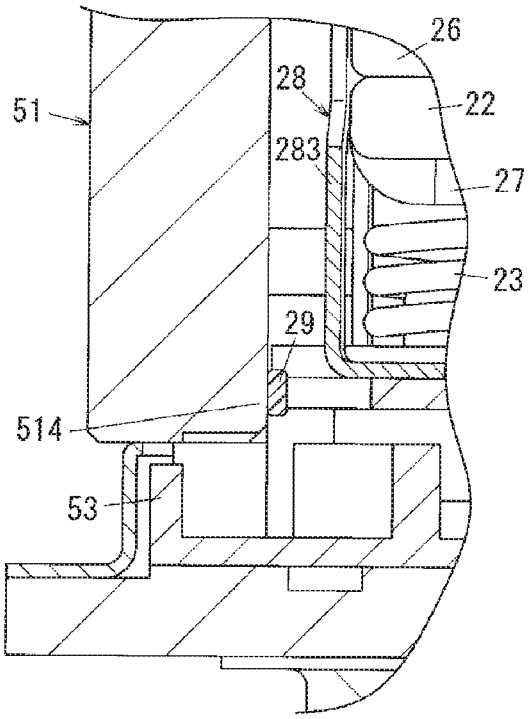
FIG. 10 is an enlarged view of an essential part of an electromagnetic relay according to a second exemplary embodiment of the present disclosure.

FIG. 10 is an enlarged view of an essential part of an electromagnetic relay according to a second exemplary embodiment of the present disclosure. The contact device of the present exemplary embodiment is different from contact device 2 of the first exemplary embodiment shown in FIG. 7 in the feature that the contact device includes resin members 29 in contact with projections 512-515, respectively. FIG. 10 shows only one of resin members 29 in contact with projection 514. The same components as in electromagnetic relay 1 of the first embodiment are denoted by the same reference numerals, and hence the description thereof will be omitted.

Contactor holder 28 of the present exemplary embodiment includes resin members 29. Resin members 29 are disposed so as to come into contact with the respective projections 512-515 when movable contactor 22 and contactor holder 28 twist around movable shaft 25. Resin members 29 are formed at the same time when the metallic portion of contactor holder 28 is formed. The same functions as those of contactor holder 28 in the first exemplary embodiment are not described here.

In the above described configuration, resin members 29 are in contact with projections 512-515, respectively, thereby reducing metal exposure, and hence, the probability of arc-over.

Resin members 29 may alternatively be formed separately from the metallic portion of contactor holder 28. In this case, resin members 29 can, for example, be stuck to the metallic portion of contactor holder 28.

What is claimed is:

1. [A contact device] *An electromagnetic relay* comprising:

a pair of fixed contacts aligned in a first direction;

a movable contactor [configured to come] *that comes* into or out of contact with the pair of fixed contacts by *a* movement in a second direction orthogonal to the first direction;

a contactor holder that holds the movable contactor;

a movable shaft [which] *that* moves the contactor holder in the second direction so that the movable contactor comes into or out of contact with the pair of fixed contacts and twists about the movable shaft; [and]

a [base that] *case that comprises a plurality of wall portions and a planar surface that covers upper edges of the wall portions on one end of the case while leaving its other end open to form an open bottom box,*

*wherein the case* accommodates the pair of fixed contacts, the movable contactor, and the contactor holder,

*wherein* the [base having] *case includes* a [projection projecting from a position opposing the contactor holder] *first protrusion that projects from one of the wall portions towards interior of the case* in a third direction orthogonal to both the first direction and the second direction, *and*

*wherein the case and the first protrusion are integrally formed from same material; and*

*a winding that causes the movable shaft to move in the second direction depending on whether the winding is energized or not,* wherein the contactor holder comes into contact with the [projection] *first protrusion* along the third direction when the movable contactor and the contactor holder twist around the movable shaft.

[2. The contact device according to claim 1, wherein the contactor holder has an upper area and a lower area, the lower area is more distant from the movable contactor than the upper area in the second direction, and the lower area has a larger length than the upper area in the third direction.]

[3. The contact device according to claim 1, wherein the projection has a curved end surface, and the contactor holder has a flat surface opposing the projection.]

[4. The contact device according to claim 1, wherein the contactor holder has a projected area at a position opposing the projection.]

[5. The contact device according to claim 1, wherein the contactor holder includes a resin member which comes into contact with the projection when the movable contactor and the contactor holder twist.]

[6. The contact device according to claim 1, wherein the projection is one of a plurality of projections aligned in the first direction, and the base has the plurality of projections.]

[7. The contact device according to claim 1, wherein the projection is one of a pair of projections provided on a pair of inner surfaces of the base, opposing each other in the third direction.]

[8. An electromagnetic relay comprising:

the contact device according to claim 1; and a driver which drives the movable shaft so that the movable contactor comes into or out of contact with the pair of fixed contacts.]

[9. The contact device according to claim 1, the projection comprising a plurality of projections, wherein, when the movable contactor and the contactor holder twist around the movable shaft in a first twist direction, at least one of the plurality of projections comes into contact with the contactor holder, and when the movable contactor and the contactor holder twist around the movable shaft in a second twist direction opposite to the first twist direction, a different at least one of the plurality of projections comes into contact with the contactor holder.]

[10. The electromagnetic relay according to claim 8, the projection of the contact device comprising a plurality of projections, wherein, when the movable contactor and the contactor holder of the contact device twist around the movable shaft of the contact device in a first twist direction, at least one of the plurality of projections comes into contact with the contactor holder, and when the movable contactor and the contactor holder twist around the movable shaft in a second twist direction opposite to the first twist direction, a different at least one of the plurality of projections comes into contact with the contactor holder.]

*11. The electromagnetic relay according to claim 1, further comprising:*

*a magnetic material disposed on a surface of the movable contactor,*

*wherein*

*the contactor holder further holds the magnetic material,*

*the contactor holder includes side parts that are disposed across from each other,*

*the movable contactor is provided between the side parts, and*

*each of the side parts includes:*

*an upper portion facing the magnetic material, and*

*two side portions extending downward from the upper portion.*

*12. The electromagnetic relay according to claim 1, further comprising:*

*a magnetic material disposed on a surface of the movable contactor;*

*a yoke disposed in the case and under the movable contactor; and*

*a spring disposed in the case and under the yoke,*

*wherein the contact holder holds the magnetic material, the yoke and the spring.*

*13. The electromagnetic relay according to claim 12,*

*the case further includes a second protrusion facing the first protrusion along the third direction, and*

*the magnetic material is absent in an area between a peak of the first protrusion and a peak of the second protrusion.*

*14. The electromagnetic relay according to claim 13, wherein*

*the magnetic material is fixed to the contactor holder, and*

*the movable contactor*

*is pressed towards the magnetic material by the spring, and*

*is held by the contactor holder.*

*15. The electromagnetic relay according to claim 12,*

*wherein the magnetic material and the movable contactor are held by the contactor holder and are a part of the contact holder.*

*16. The electromagnetic relay according to claim 12, wherein:*

*the case further includes a third protrusion that is disposed adjacent to the first protrusion and projects*

*towards interior of the case, and a fourth protrusion disposed across from the third protrusion to face the third protrusion, and*

*the magnetic material is absent in an area between a peak of the third protrusion and a peak of the fourth protrusion.*

*17. The electromagnetic relay according to claim 1, further comprising:*

*a pair of fixed terminals,*

*wherein each of the pair of fixed contacts is provided to each of the pair of fixed terminals, and*

*wherein the planar surface includes a pair of through holes, each of the pair of through holes accommodating each of the pair of fixed terminals.*

*18. An electromagnetic relay, comprising:*

*a pair of fixed contacts;*

*a movable contactor that comes into or out of contact with the pair of fixed contacts;*

*a magnetic material disposed on a surface of the movable contactor;*

*a contactor holder that holds the movable contactor and the magnetic material,*

*wherein the contactor holder includes side parts that are disposed to be across from each other, and*

*wherein the movable contactor is provided between the side parts;*

*a movable shaft that moves the contactor holder so that the movable contactor comes into or out of contact with the pair of fixed contacts and twists the contactor holder;*

*a case that*

*comprises a plurality of wall portions and a planar surface that covers upper edges of the wall portions on one end of the case while leaving its other end open to form an open bottom box,*

*accommodates the pair of fixed contacts, the movable contactor, the contactor holder, and the magnetic material, and*

*includes a first protrusion that projects from one of the wall portions towards interior of the case, wherein the case and the first protrusion are integrally formed from same material; and*

*a winding that is disposed outside of the case and moves the movable shaft depending on whether the winding is energized or not,*

*wherein each of the side parts includes:*

*an upper portion facing the magnetic material, and*

*two side portions extending downward from the upper portion, and*

*wherein the contactor holder comes into contact with the first protrusion when the contactor holder twist around the movable shaft.*

*19. The electromagnetic relay according to claim 18,*

*wherein the case further includes a second protrusion disposed on a same surface that the first protrusion is disposed,*

*wherein a length between a base point of the first projection that is closer to a first corner of the case and a base point of the second protrusion that is closer to a second corner of the case is longer than a length between the two side portions,*

*wherein the first protrusion projects towards the interior of the case from the base point of the first projection, and*

*wherein the second protrusion projects towards the interior of the case from the base point of the second projection.*

*20. The electromagnetic relay according to claim 18, wherein the case further includes a third protrusion that faces the first protrusion, and projects towards the first projection, and*

*the pair of fixed contacts are absent in an area between a peak of the first protrusion and a peak of the third protrusion.*

*21. The electromagnetic relay according to claim 18, wherein the magnetic material and the movable contactor are held by the contactor holder and are a part of the contact holder.*

*22. The electromagnetic relay according to claim 18, wherein each of the side parts further includes a through hole surrounded by the upper portion and the two side portions, and not facing a peak of the first protrusion when the contact holder is not twisted.*

*23. An electromagnetic relay, comprising:*

*a case that*

*comprises a plurality of wall portions and a planar surface that covers upper edges of the wall portions on one end of the case while leaving its other end open to form an open bottom box, and*

*includes a first protrusion and a second protrusion that is disposed across from the first protrusion to face the first protrusion, wherein the first protrusion projects from one of the wall portions towards the second protrusion and the second protrusion project from another of the wall portions towards the first protrusion, and wherein the case, the first protrusion and the second protrusion are integrally formed from same material;*

*a pair of fixed contacts disposed in the case;*

*a movable contactor that*

*is disposed in the case, and*

*comes into or out of contact with the pair of fixed contacts;*

*a magnetic material disposed on the movable contactor and between the pair of the fixed contacts, wherein the magnetic material is absent in an area between a peak of the first protrusion and a peak of the second protrusion;*

*a yoke disposed in the case and under the movable contactor;*

*a spring disposed in the case and under the yoke; and*

*a contactor holder disposed in the case, and that holds the pair of fixed contacts, the movable contactor, the magnetic material, the yoke and the spring,*

*wherein the contactor holder comes into and out of contact with the first protrusion or the second protrusion.*

*24. The electromagnetic relay according to the claim 23, wherein the case further includes a third protrusion and a fourth protrusion that is disposed across from the third protrusion to face the third protrusion,*

*wherein the third protrusion and the fourth protrusion project towards each other,*

*wherein the magnetic material is absent in an area between a peak of the third protrusion and a peak of the fourth protrusion, and*

*wherein a width of the magnetic material is smaller than a distance between the peak of the third protrusion and the peak of the fourth protrusion.*

*25. The electromagnetic relay according to claim 23, wherein the magnetic material and the movable contactor are held by the contactor holder and are a part of the contact holder.*

* * * * *